United States Patent [19]

Matsunaga

[11] Patent Number: 5,262,857
[45] Date of Patent: Nov. 16, 1993

[54] STILL-IMAGE VIDEO SIGNAL PROCESSING CIRCUIT

[75] Inventor: Osamu Matsunaga, Kanagawa, Japan

[73] Assignee: Sony Corporation, Tokyo, Japan

[21] Appl. No.: 708,299

[22] Filed: May 31, 1991

[30] Foreign Application Priority Data

Jun. 7, 1990 [JP] Japan ................................ 2-149585

[51] Int. Cl.⁵ .............................................. H04N 7/12
[52] U.S. Cl. ...................................... 358/138; 358/140
[58] Field of Search ................. 358/138, 141, 140, 11, 358/12, 13, 133

[56] References Cited

U.S. PATENT DOCUMENTS 5,128,759  7/1992  Matsunaga ........................ 358/138

Primary Examiner—James J. Groody
Assistant Examiner—David E. Harvey
Attorney, Agent, or Firm—Lewis H. Eslinger; Jay H. Maioli

[57] ABSTRACT

A still-image video signal processing circuit for a MUSE decoder has a pair of frame memories for producing first digital video signals which vary from each other by a delay time difference corresponding to a period of two frames, and second digital video signals which vary from each other by a delay time difference corresponding to a period of one frame, from a MUSE signal, i.e., a three-dimensionally sub-sampled input digital video signal, and a noise removing circuit for removing noise from the input digital video signal with the first digital video signal supplied thereto. An interframe interpolating circuit interpolates the input digital video signal between frames with the second digital video signals supplied thereto, and an interfield interpolating circuit interpolates the input digital video signal with the second digital video signals supplied thereto from the frame memories.

2 Claims, 6 Drawing Sheets

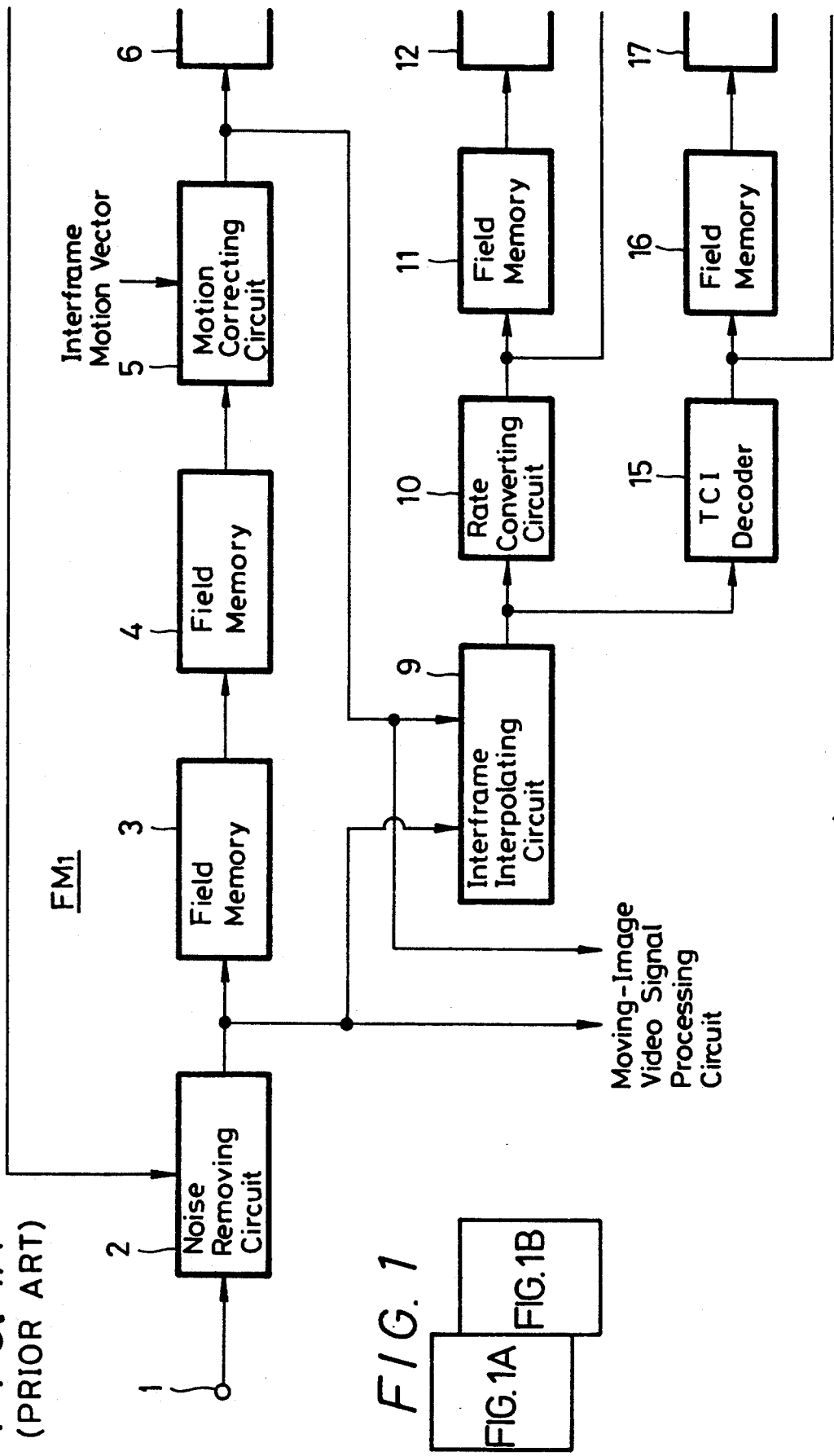

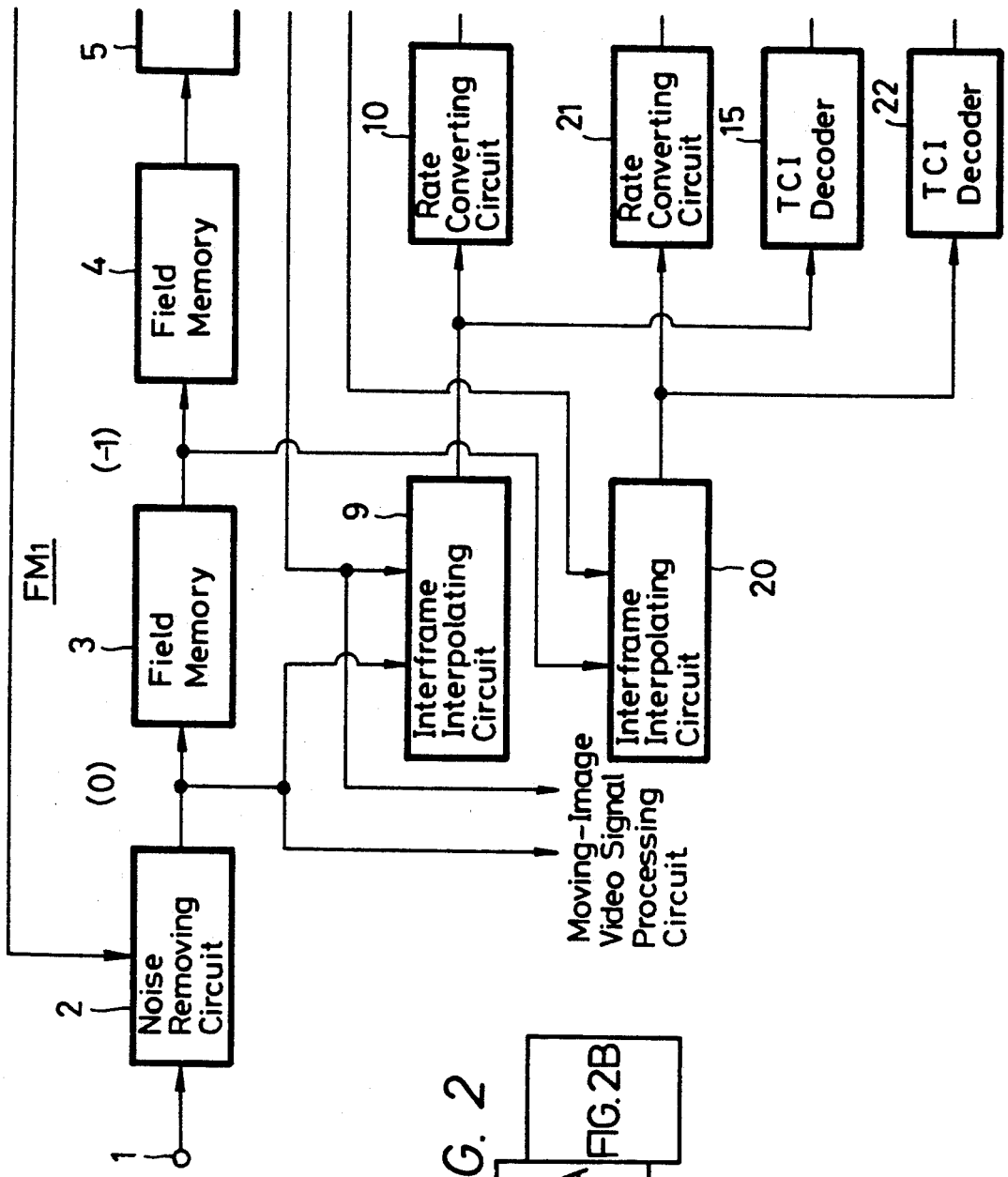

STILL-IMAGE VIDEO SIGNAL PROCESSING CIRCUIT

BACKGROUND OF THE INVENTION

1. Field of the Invention

The present invention relates to a still-image video signal processing circuit for a MUSE decoder.

2. Description of the Prior Art

FIGS. 1A and 1B of the accompanying drawings show a conventional still-image video signal processing circuit for a MUSE decoder. A MUSE signal from an input terminal 1, i.e., an input digital video signal (input digital color video signal) which has been three-dimensionally sub-sampled, is supplied to a noise removing circuit (noise suppressing circuit) 2. A digital video signal (digital color video signal) from which noise has been removed by the noise removing circuit 2 is supplied to a frame memory FM1 which comprises field memories 3, 4 connected in cascade, the frame memory FM1 having a delay time corresponding to one frame (=2 fields). The digital video signal is first delayed for a period of one field by the front field memory 3. The digital video signal from the front field memory 3 is then supplied to the rear field memory 4, by which the digital video signal is further delayed for a period of one field. The digital video signal from the rear field memory 4 is then supplied to a motion correcting circuit 5 in which the digital video signal of the previous frame is displaced by the value of its motion vector based on an interframe motion vector detecting signal transmitted from an encoder.

The digital video signal from the motion correcting circuit 5 is then supplied to a frame memory FM2 which comprises field memories 6, 7 connected in cascade, the frame memory FM2 having a delay time corresponding to one frame. The digital video signal is also supplied to an interframe interpolating circuit 9. The digital video signal is delayed for a period of one field by the front field memory 6. The digital video signal from the front field memory 6 is supplied to the rear field memory 7 and further delayed for a period of one field thereby. The digital video signal from the rear field memory 7 is supplied to a motion correcting circuit 8, and corrected for motion thereby. The digital video signal which is delayed by two frames with respect to the input digital video signal supplied to the input terminal 1 is fed back to the noise removing circuit 2, in which the noise of the input digital video signal is removed (suppressed).

The input digital video signal, from which the noise has been removed, from the noise removing circuit 2 is supplied to the interframe interpolating circuit 9. The interframe interpolating circuit 9 interpolates, between frames, the input digital video signal with the digital video signal, which has been delayed a period of one frame with respect to the input digital video signal, supplied from the motion correcting circuit 5 to the interframe interpolating circuit 9. The digital video signals from the noise removing circuit 2 and the motion correcting circuit 5 are supplied to a moving-image video signal processing circuit.

Of the digital video signal from the interframe interpolating circuit 9, a digital luminance signal of 32.4 Msps (megasamples per second) is supplied to a rate converting circuit 10 by which it is converted in rate into a digital luminance signal of 24.3 Msps. Thereafter, the digital luminance signal is supplied to a field memory 11, and delayed for a period of one field thereby.

The digital luminance signal from the field memory 11 is then supplied to a motion correcting circuit 12, and corrected for motion thereby.

The digital luminance signal from the rate converting circuit 10 is supplied to and interpolated between fields by an interfield interpolating circuit 13 with the digital luminance signal which has been supplied from the motion correcting circuit 12 to the interfield interpolating circuit 13 and delayed one field period with respect to the digital luminance signal from the rate converting circuit 10. The interfield interpolating circuit 13 produces a still-image luminance signal of 48.6 Msps and supplies the same to an output terminal 14.

Of the digital video signal from the interframe interpolating circuit 9, a digital chrominance signal (line sequential signal composed of digital red and blue color difference signals) which has been compressed to a ¼ time is supplied to a TCI decoder 15, and expanded four times in time thereby. Then, the digital chrominance signal is supplied to and delayed one field by a field memory 16.

The digital chrominance signal of 8.1 Msps from the TCI decoder 15 is supplied to and interpolated between fields by an interfield interpolating circuit 17 with the digital chrominance signal which has been supplied from the field memory 16 and delayed one field period with respect to the digital chrominance signal from the TCI decoder 15. The interfield interpolating circuit 17 produces a still-image chrominance signal of 16.2 Msps and supplies the same to an output terminal 18.

The field memory 11 for delaying the digital luminance signal is required to have a storage capacity of about 3 Mbits, and the field memory 16 for delaying the digital chrominance signal is required to have a storage capacity of about 1 Mbits. Actually, the field memory 11 comprises a frame memory having a storage capacity of about 4 Mbits.

The conventional still-image video signal processing circuit employs two frame memories FM1, FM2, i.e., four field memories 3, 4, 6, 7, for removing noise from and interpolating the digital video signal between frames, and also two field memories 11, 16 for interpolating the digital luminance and chrominance signals between fields. Therefore, these memories are required to have a large storage capacity.

OBJECTS AND SUMMARY OF THE INVENTION

In view of the aforesaid drawback of the conventional still-image video signal processing circuit, it is an object of the present invention to provide a still-image video signal processing circuit for a MUSE decoder, which processing circuit requires a reduced storage capacity of memories needed to remove noise from and interpolate a digital video signal between frames and fields.

According to the present invention, there is provided a still-image video signal processing circuit for a MUSE decoder, comprising delay means, composed of a pair of frame memories, for producing first digital video signals which vary from each other by a delay time difference corresponding to a period of two frames and second digital video signals which vary from each other by a delay time difference corresponding to a period of one frame, from a three-dimensionally sub-sampled input digital video signal, a noise removing circuit for removing noise from the input digital video signal with the first digital video signal supplied thereto, an interframe interpolating circuit for interpolating the input digital video signal between frames with the second digital video signals supplied thereto, and an interfield interpolating circuit for interpolating the input digital video signal with the second digital video signals supplied thereto from the delay means.

The second digital video signals are supplied from the delay means to the interfield interpolating circuit, and the interfield interpolating circuit interpolates the input digital video signal between fields with the supplied second digital video signal.

The above and other objects, features, and advantages of the present invention will become apparent from the following detailed description of illustrative embodiments thereof to be read in conjunction with the accompanying drawings, in which like reference numerals represent the same or similar objects.

BRIEF DESCRIPTION OF THE DRAWINGS

FIGS. 1A and 1B are block diagrams of a conventional still-image video signal processing circuit for a MUSE decoder;

FIGS. 2A and 2B are block diagrams of a still-image video signal processing circuit for a MUSE decoder according to an embodiment of the present invention.

DETAILED DESCRIPTION OF THE PREFERRED EMBODIMENTS

Figure 1B:
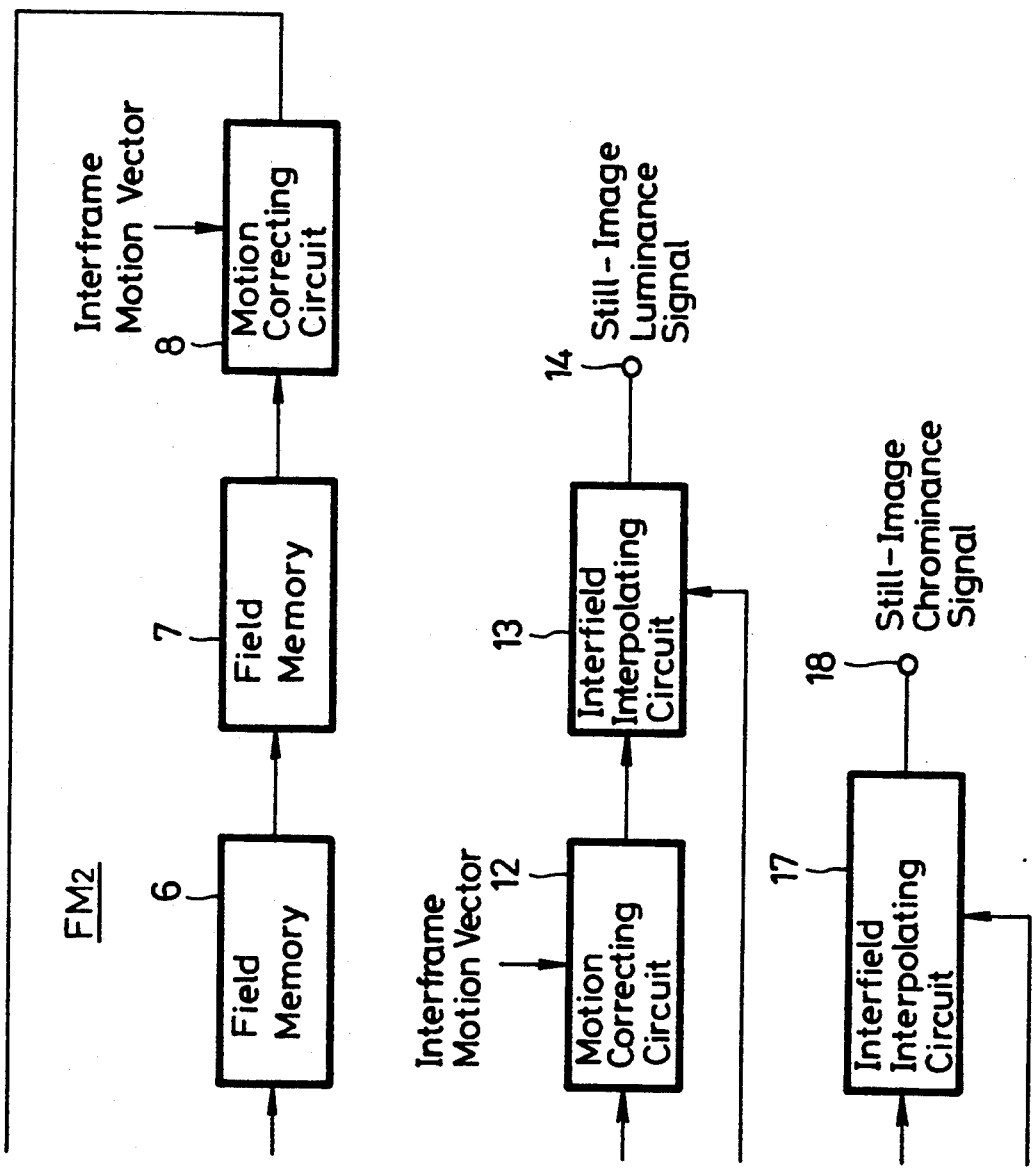
Figure 2B:
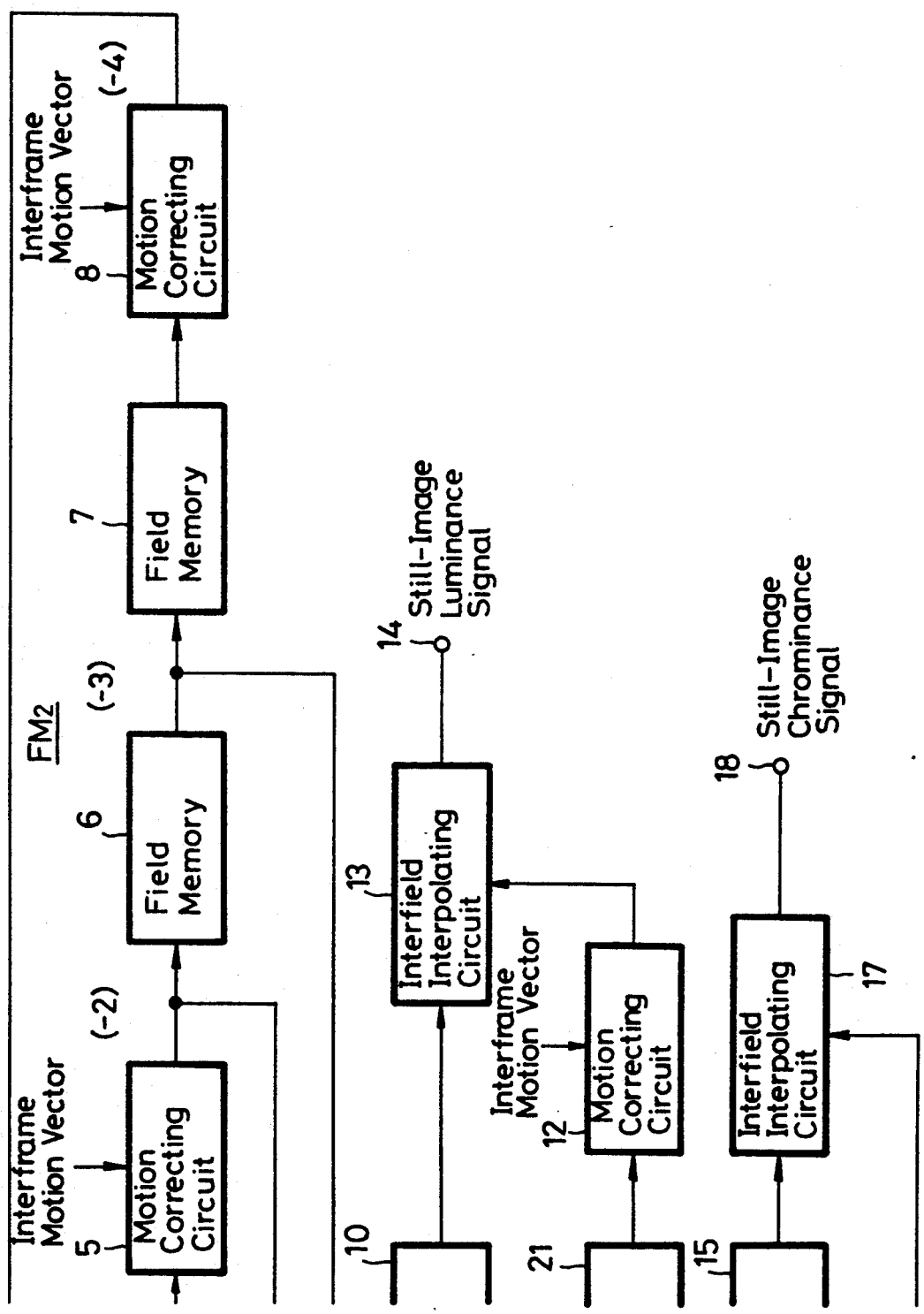

FIGS. 2A and 2B show a still-image video signal processing circuit for a MUSE decoder according to an embodiment of the present invention. Those parts shown in FIGS. 2A and 2B which are identical to those shown in FIGS. 1A and 1B are denoted by identical reference numerals, and will not be described in detail.

The numerals in parentheses (0), (−1), (−2), (−3), and (−4) are placed between the noise removing circuit 2 and the field memory 3, between the field memories 3, 4, between the motion correcting circuit 5 and the field memory 6, between the field memories 6, 7, and on the output side of the motion detecting circuit 8. The numerals with the negative sign represent the number of delay times each corresponding to one field, as measured from the delay time 0 of the input digital video signal which has been produced by the noise removing circuit 2 and from which noise has been removed.

According to the embodiment shown in FIGS. 2A and 2B, the still-image video signal processing circuit includes another interframe interpolating circuit 20 in addition to the interframe interpolating circuit 9. The digital video signal from the field memory 3 is supplied to the interframe interpolating circuit 20 and interpolated between frames thereby with the digital video signal that has been delayed a period of one frame with respect to the digital video signal from the field memory 3 supplied from the field memory 6 to the interframe interpolating circuit 20.

Of the digital video signals from the interframe interpolating circuits 9, 20, digital luminance signals of 32.4 Msps are supplied respectively to rate converting circuits 10, 21 by which they is converted in rate into digital luminance signals of 24.3 Msps. Thereafter, the digital luminance signal from the rate converting circuit 21 is supplied to the motion correcting circuit 12, and corrected for motion thereby in the same manner as with the conventional circuit shown in FIG. 3.

The digital luminance signal from the rate converting circuit 10 is supplied to and interpolated between fields by the interfield interpolating circuit 13 with the digital luminance signal which has been supplied from the motion correcting circuit 12 to the interfield interpolating circuit 13 and delayed a period of one field with respect to the digital luminance signal supplied from the rate converting circuit 1 to the interfield interpolating circuit 13. The interfield interpolating circuit 13 produces a still-image luminance signal of 48.6 Msps and supplies the same to the output terminal 14.

Of the digital video signals from the interframe interpolating circuits 9, 20, digital chrominance signals (line sequential signals composed of digital red and blue color difference signals) which have been compressed to a ¼ time are supplied respectively to TCI decoders 15, 22, and expanded four times in time thereby.

The digital chrominance signal of 8.1 Msps from the TCI decoder 15 is supplied to and interpolated between fields by the interfield interpolating circuit 17 with the digital chrominance signal which has been supplied from the TCI decoder 22 to the interfield interpolating circuit 17 and delayed one field period with respect to the digital chrominance signal from the TCI decoder 15. The interfield interpolating circuit 17 produces a still-image chrominance signal of 16.2 Msps and supplies the same to the output terminal 18.

Figures 3, 3A:
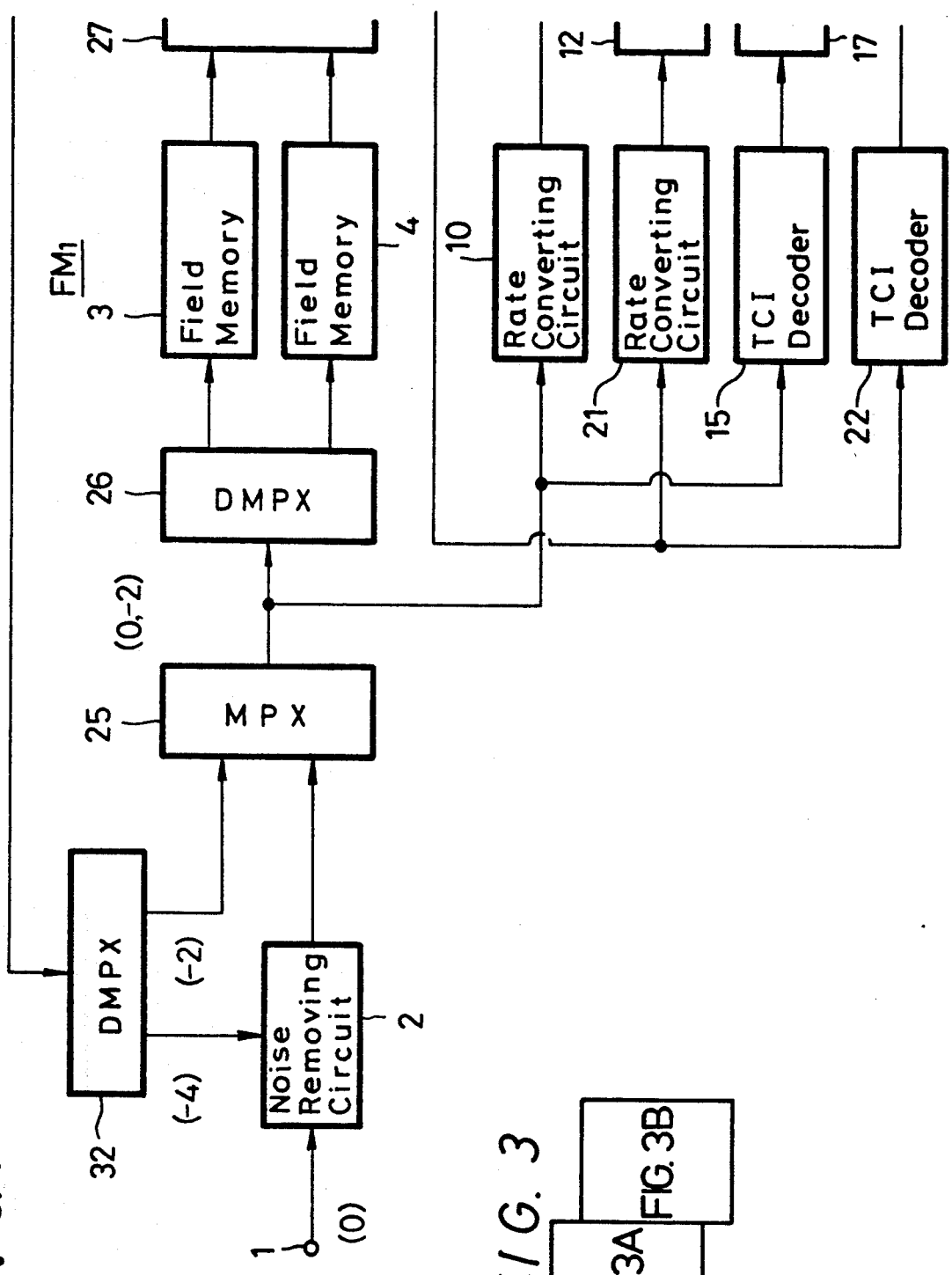
FIGS. 3A and 3B are block diagrams of a still-image video signal processing circuit for a MUSE decoder according to another embodiment of the present invention.
Figure 3B:
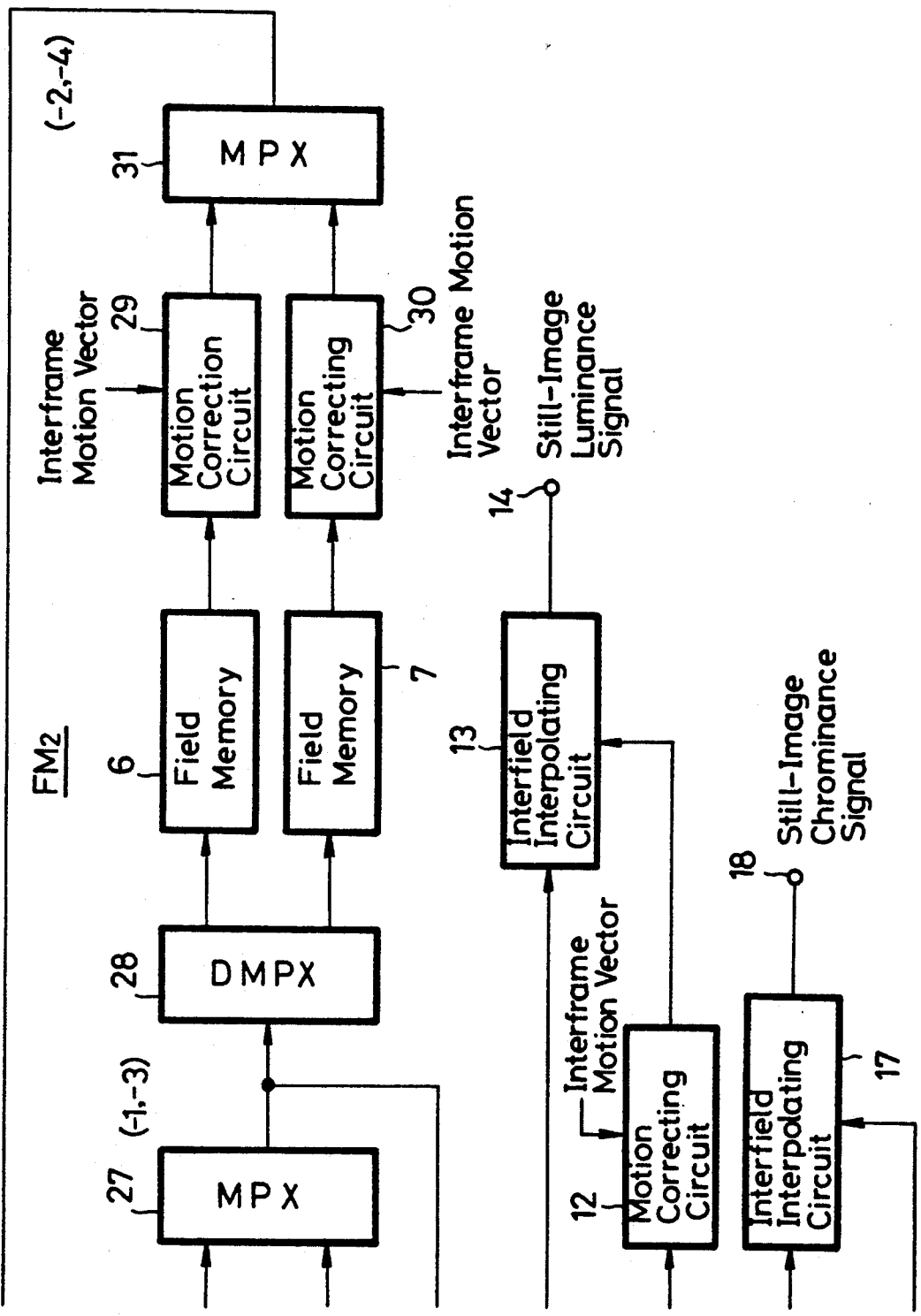

FIGS. 3A and 3B show a still-image video signal processing circuit for a MUSE decoder according to another embodiment of the present invention. Those parts shown in FIGS. 3A and 3B which are identical to those shown in FIGS. 2A and 2B are denoted by identical reference numerals, and will not be described in detail.

The frame memory FM1 of the still-image video signal processing circuit shown in FIGS. 3A and 3B comprises a demultiplexer 26 supplied with an input signal, the field memories 3, 4 selectively supplied with the output signal from the demultiplexer 26, and a multiplexer 27 supplied with the output signals from the field memories 3, 4, for producing an output signal composed of the supplied signals. The frame memory FM1 has a delay time corresponding to one field. The frame memory FM2 similarly comprises a demultiplexer 28 supplied with an input signal, the field memories 6, 7 selectively supplied with the output signal from the demultiplexer 28, and a multiplexer 31 supplied with the output signals from the field memories 6, 7, for producing an output signal composed of the supplied signals. The frame memory FM2 has a delay time corresponding to one field.

The frame memory FM2 additionally includes motion correcting circuits 29, 30 between the field memories 6, 7 and the multiplexer 31.

The output signal from the multiplexer 31 of the frame memory FM2 is supplied to a demultiplexer 32. One of the output signals from the demultiplexer 32 is supplied to the noise removing circuit 2. The other output signal from the demultiplexer 32 and the output signal from the noise removing circuit 2 are supplied to a multiplexer 25, which supplies its output signal to the demultiplexer 2 of the frame memory FM1.

The digital video signal, with noise removed therefrom, from the noise removing circuit 2 is supplied through the multiplexer 25 to the frame memory FM1.

The supplied digital video signal is delayed one field period by the field memory 3, for example. The digital video signal from the frame memory FM1 is supplied to the frame memory FM2, and further delayed one field period by the field memory 6, for example.

The digital video signal from the field memory FM2 is supplied to the frame memory FM 1 through the demultiplexer 32 and the multiplexer 25. The supplied digital video signal is delayed a period of one field by the field memory 4. The output signal from the frame memory FM1 is supplied to the frame memory FM2, and delayed a period of one field by the field memory 7. The output signal from the frame memory FM2 is supplied to the noise removing circuit 2 through the demultiplexer 32.

Between the multiplexer 25 and the frame memory FM1, between the frame memories FM1, FM2, and on the output side of the frame memory FM2, there are produced digital video signals that are delayed by two different delay times as indicated by the numerals (0, −2), (−1, −3), and (−2, −4), respectively.

In the embodiment shown in FIGS. 3A and 3B, the multiplexers 25, 27 perform the same function as that of the interframe interpolating circuits 9, 20 according to the embodiment shown in FIGS. 2A and 2B. Therefore, the output signal from the multiplexer 25 is supplied to the rate converting circuit 10 and the TCI decoder 15, and the output signal from the multiplexer 27 is supplied to the rate converting circuit 21 and the TCI decoder 22.

The other structural details and operation of the embodiment shown in FIGS. 3A and 3B are the same as those of the embodiment shown in FIGS. 2A and 2B.

In the embodiments shown in FIGS. 2A, 2B and 3A, 3B, since no field memories 11, 16 are employed, the MUSE decoder is less expensive. While each of the embodiments shown in FIGS. 2A, 2B and 3A, 3B has one more interframe interpolating circuit, one more rate converting circuit, and one more TCI decoder than the conventional arrangement shown in FIGS. 1A and 1B, such an increase in circuitry will pose substantially no problem if the MUSE decoder is fabricated as an LSI circuit.

With the present invention, as described above, any dedicated memories used for interfield interpolation are not required, and hence the storage capacity of memories required for noise removal, interframe interpolation, and interfield interpolation may be reduced.

Having described preferred embodiments of the invention with reference to the accompanying drawings, it is to be understood that the invention is not limited to the precise embodiments and that various changes and modifications could be effected by one skilled in the art without departing from the spirit or scope of the invention as defined in the appended claims.

I claim as my invention:

1. A still-image video signal processing circuit for a MUSE decoder, comprising:

delay means composed of a pair of frame memories for producing a first digital video signal which varies from an input signal fed thereto by a delay time difference corresponding to a period of two frames and for producing second digital video signals which vary from each other by a delay time difference corresponding to a period of one frame;

a noise removing circuit for removing noise from a three-dimensionally sub-sampled digital video signal in response to said first digital video signal supplied thereto and producing the input signal fed to said delay means;

first and second interframe interpolating circuits for interpolating said input signal from said noise removing circuit between frames with said second digital video signals supplied thereto from said delay means and producing first and second interframe interpolated output signals; and first and second interfield interpolating circuit each for interpolating said first interframe interpolated output signal with said second interframe interpolated output signal supplied thereto from said first and second interframe interpolation circuits.

2. A still-image video signal processing circuit for a MUSE decoder, comprising:

delay means comprised of two pairs of parallel-connected field memories, each pair having a respective demultiplexer at an input end and a respective multiplexer at an output end for producing a first digital video signal and a plurality of second digital video signals;

a third multiplexer providing an input signal fed to said delay means;

a noise removing circuit for removing noise from a three-dimensionally sub-sampled digital video input signal in response to said first digital video signal from said delay means and producing the input signal fed to said delay means, in which said first digital video signal varies from said input signal by a delay time difference corresponding to a period of two frames after the input signal from the noise removing circuit has passed through said delay means two times and said plurality of second digital video signals vary from each other by a delay time difference corresponding to a period of one frame; and first and second interfield interpolating circuit each for interpolating respectively said plurality of second digital video signals from said delay means.

* * * * *